H. B. KNIGHTS.
ANIMAL TRAP.
APPLICATION FILED MAR. 1, 1916.
1,186,408.
Patented June 6, 1916.
2 SHEETS—SHEET 1.
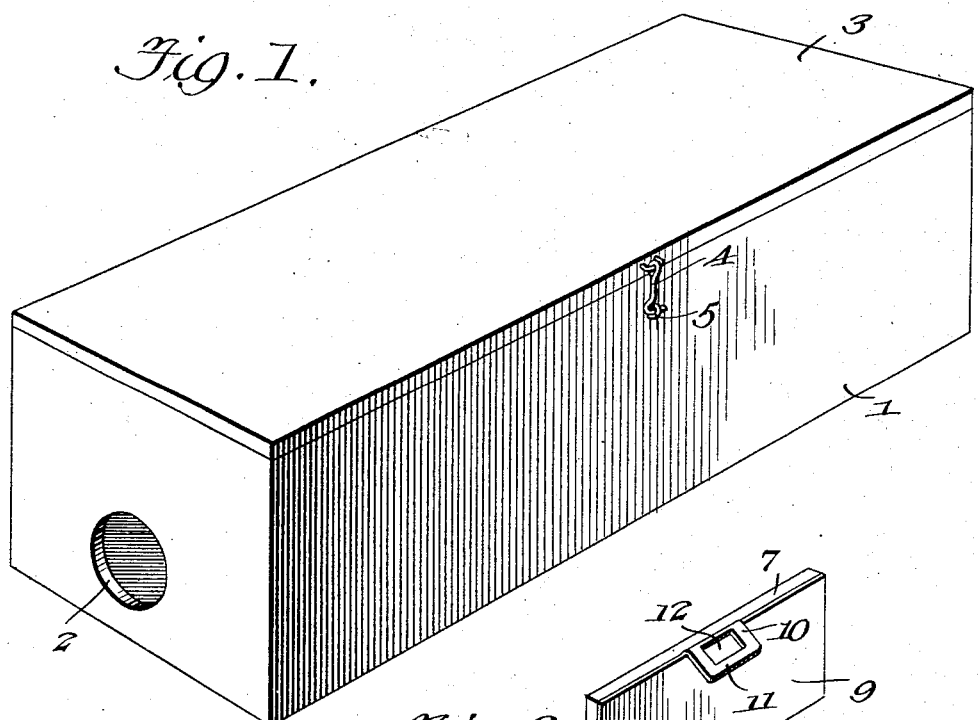
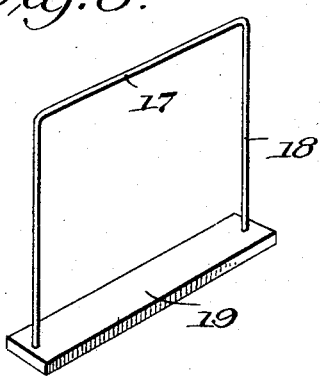
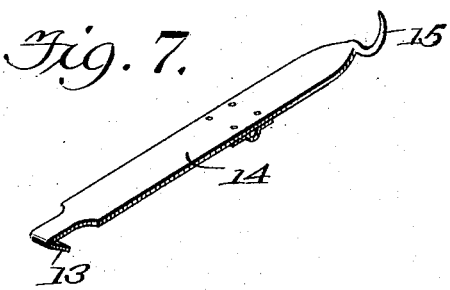
Witness
Hugh H. Ott
Inventor
Harold B. Knights
By Victor J. Evans
Attorney H. B. KNIGHTS.
ANIMAL TRAP.
APPLICATION FILED MAR. 1, 1916.
1,186,408.
Patented June 6, 1916.
2 SHEETS—SHEET 2.
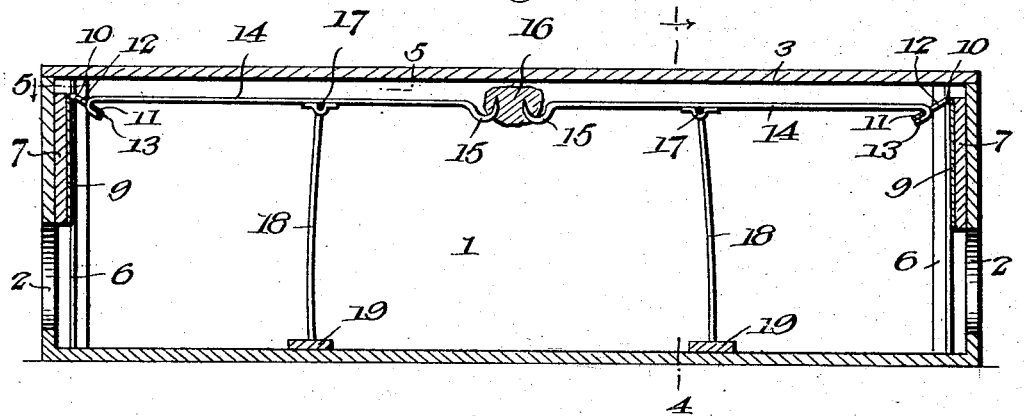
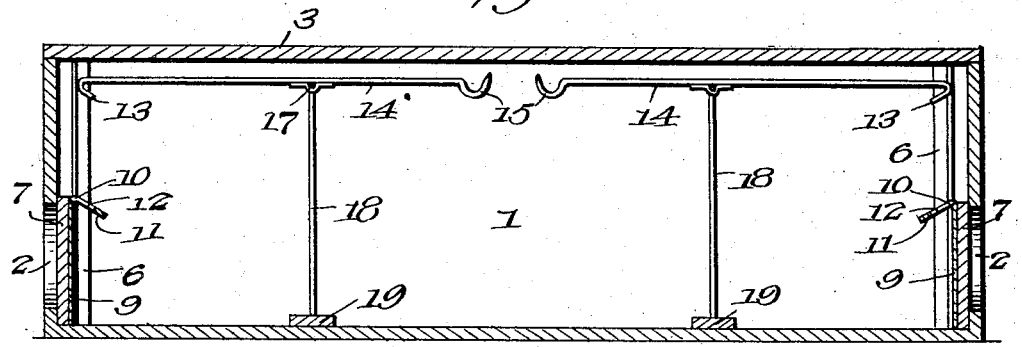
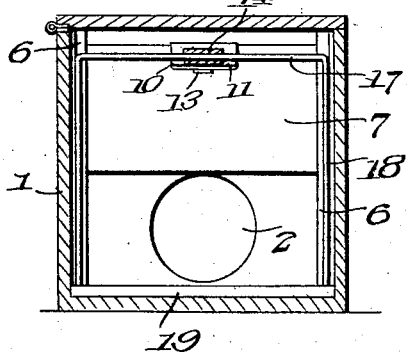
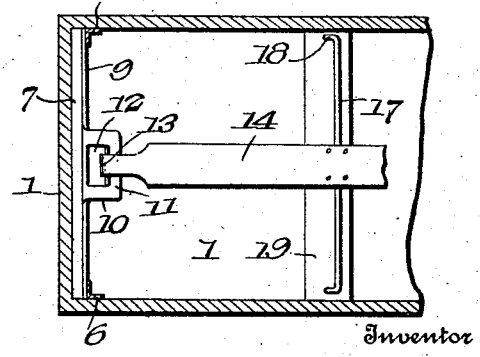
Witness
Hugh H. Ott
Inventor
Harold B. Knights
By Victor J. Evans
Attorney

UNITED STATES PATENT OFFICE.

HAROLD BURBANK KNIGHTS, OF ALBION, MAINE.

ANIMAL-TRAP.

1,186,408.  Specification of Letters Patent.  Patented June 6, 1916.

Application filed March 1, 1916. Serial No. 81,488.

*To all whom it may concern:*

Be it known that I, HAROLD B. KNIGHTS, a citizen of the United States, residing at Albion, in the county of Kennebec and State of Maine, have invented new and useful Improvements in Animal-Traps, of which the following is a specification.

This invention relates to improvements in animal traps and is especially designed for catching rodents such as rats or mice.

In carrying out my invention it is my purpose to construct a trap which shall include a housing having diammetrically opposite inlet openings and gravity doors for normally closing the openings, to provide spring impelled catch members for each of the doors which are adapted when arranged in longitudinal alinement to so engage with the doors as to sustain the same in their open position and which are further adapted to be held in such position by a bait which connects the two catch members and which when removed or interfered with will swing the said catch members to bring the same out of contact with the doors to permit of the gravitation of the doors to a closed position.

Another object of the invention is to construct a trap of this character which shall embody the desirable features of simplicity, cheapness and thorough efficiency.

With the above and other objects in view, the improvement resides in the construction, combination and arrangement of parts set forth in the following specification and falling within the scope of the appended claims.

In the drawings: Figure 1 is a view of a trap constructed in accordance with the present invention, Fig. 2 is a central longitudinal sectional view of the doors in raised position, Fig. 3 is a similar sectional view of the bait removed or after being tampered with to permit of the swinging of the catch members to allow the doors to gravitate to their closed position, Fig. 4 is a transverse sectional view approximately on the line 4—4 of Fig. 2, Fig. 5 is a similar sectional view approximately on the line 5—5 of Fig. 2, Fig. 6 is a perspective view of the door, Fig. 7 is a similar view of one of the catch members, and Fig. 8 is a similar view of one of the spring yoke members associated one with each of the catch members.

In reducing my improvement to practice I provide a housing 1 which is preferably in the nature of a rectangular or box-like structure and which has its opposite ends provided, adjacent its base portion, with inlet openings 2. The top of the housing is opened, but is normally closed by a door or cover member 3 which is preferably hingedly connected thereto at one of the sides of the housing 1 and its free end secured upon the said housing by a suitable catch which may be in the nature of a hook 4 which engages with an eye 5. The openings 2 are preferably rounded and the sides of the housing adjacent the ends thereof are formed or otherwise provided with vertically extending cleats 6 which provide in connection with the said ends, ways, for gravity doors 7—7 which normally close the openings 2.

The structure may be formed of wood, in which instance, the same is preferably provided with an inner lining of metal, so that the trapped animals can not gnaw through the same, but of course, the device may be constructed of any desired material, as will be understood.

Each of the doors 7 is of a width approximately equalling one-half of the height of the housing 1, and when the same is constructed of wood, the said doors are provided with an inner facing of metal, indicated by the numeral 9, and the upper edge of the metal is formed with an inwardly extending downwardly inclined tongue 10. The tongue 10 is provided with a central longitudinally extending slot 12 through which is adapted to be passed and to engage with the inner face of the end portion 11 of the said tongue, the angular portion of a hook 13 provided upon one end of a longitudinally extending catch member 14. Each of the catch members is of a similar construction, and each has its inner edge provided with an upturned portion or lip 15, the said lips adapted to receive a bait 16 which is adapted to maintain the catch members in longitudinal alinement.

The numerals 18 designate spring bails which are preferably constructed from a single strand of wire bent to provide parallel vertically disposed arms and a horizontal connecting member 17 for the arms. The catch members 14 are hingedly connected with the said portions 17 of the bails, and the vertically arranged arms of the said bails are disposed in cleats 19 that are secured to the bottom of the trap. The spring bails 18 are adapted to exert a tension toward the hook ends 13 of the catch members 14, so that when the bait 16 is removed from the lipped ends 15 of the said catch members or is otherwise tampered with to swing the catch members in the direction of the doors the hook ends of the said catch members will be released from the tongues of the doors to permit of the said doors dropping by gravity and thus closing the openings 2.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. A trap including a housing having a closure and having its ends provided with diametrically opposite openings, and gravity doors for closing the openings, each of said doors having its upper end formed with an inturned slotted tongue, spring impelled catch members having hooked ends adapted to engage with the tongues of each of the doors, said catch members being arranged in the same longitudinal plane, means, comprising hooks at the free ends of the catch members adapted to be engaged with a bait for retaining the said members in one position to permit of the hooked ends contacting with the tongues of the doors to retain the doors in an open position and adapted, when the bait is removed or interfered with, to permit of the swinging of the catch members to disengage the hooked ends thereof from the tongues of the doors to permit of the closing of the doors.

2. In a trap of the class described, a substantially rectangular housing having ends provided with openings and a closure for its open top, the sides of the housing, adjacent the ends thereof being provided with vertically disposed cleats, gravity doors arranged between the ends and the cleats for closing the openings, a slotted tongue member upon each of the doors, spring bails in the housing, a catch member trunnioned one upon each of the bails, each of said catch members including a hook adapted to engage with one of the slotted tongues of each of the doors, and to be normally forced out of engagement therewith by the spring bails, the inner ends of the catch members having lips, adapted to be connected with a bait to force the hooks into contacting engagement with the tongues of the door, as and for the purpose set forth.

In testimony whereof I affix my signature in presence of two witnesses.

HAROLD BURBANK KNIGHTS.

Witnesses:
 CHAS. W. ABBOTT,
 CARL DRAKE.

Copies of this patent may be obtained for five cents each, by addressing the "Commissioner of Patents, Washington, D. C."